US011892038B2

(12) United States Patent
Balsdon et al.

(10) Patent No.: US 11,892,038 B2
(45) Date of Patent: Feb. 6, 2024

(54) CLUTCH SYSTEM AND METHOD OF OPERATING AN ACCESSORY SHAFT

(71) Applicant: Litens Automotive Partnership, Woodbridge (CA)

(72) Inventors: David Balsdon, Woodbridge (CA); Evan Hurry, Holland Landing (CA); Hao Tran, North York (CA); Andrew Malcolm Boyes, Aurora (CA)

(73) Assignee: LITENS AUTOMOTIVE PARTNERSHIP, Woodbridge, CA (US)

( * ) Notice: Subject to any disclaimer, the term of this patent is extended or adjusted under 35 U.S.C. 154(b) by 113 days.

(21) Appl. No.: 17/638,565

(22) PCT Filed: Aug. 27, 2020

(86) PCT No.: PCT/CA2020/051175
§ 371 (c)(1),
(2) Date: Feb. 25, 2022

(87) PCT Pub. No.: WO2021/035358
PCT Pub. Date: Mar. 4, 2021

(65) Prior Publication Data
US 2022/0307414 A1    Sep. 29, 2022

Related U.S. Application Data

(60) Provisional application No. 62/892,155, filed on Aug. 27, 2019.

(51) Int. Cl.
*F16D 27/118*    (2006.01)
*F16D 27/105*    (2006.01)
*F16D 41/20*    (2006.01)

(52) U.S. Cl.
CPC .......... *F16D 27/118* (2013.01); *F16D 27/105* (2013.01); *F16D 41/206* (2013.01)

(58) Field of Classification Search
CPC ................. F16D 27/105; F16D 27/118; F16D 41/20–206
See application file for complete search history.

(56) References Cited

U.S. PATENT DOCUMENTS 4,030,584 A * 6/1977 Lowery ................. F16D 27/105
                                                    192/84.81
5,967,274 A    10/1999 Leone et al.
8,387,767 B2    3/2013 Komorowski et al.

FOREIGN PATENT DOCUMENTS

| CN | 107035786 A | 8/2017 |
|----|----|----|
| EP | 0911536 A1 | 4/1999 |
| WO | 2013152430 A1 | 10/2013 |

OTHER PUBLICATIONS

PCT/CA2020/051175, International Search Report and Written Opinion, dated Nov. 23, 2020, Canadian Intellectual Property Office.
(Continued)

*Primary Examiner* — David R Morris
*Assistant Examiner* — James J Taylor, II
(74) *Attorney, Agent, or Firm* — Aird & McBurney LP

(57) ABSTRACT

A clutch system includes a rotary input member, a wrap spring clutch and a rotary output member. The wrap spring clutch has a first end, a second end, and a plurality of coils. The stiffness of the wrap spring clutch is selected such that, when transmitting less than a selected coil engagement torque, the clutch system transmits torque helically from the rotary input member, to the second end, helically through the wrap spring clutch to the first end, and into the rotary output member. When transmitting more than the selected coil engagement torque, the clutch system transmits torque in parallel from the rotary input member, to the second end, (Continued)

helically through the wrap spring clutch to the first end, and into the rotary output member, and from the rotary input member through the coil engagement surface, to the first end, and into the rotary output member.

17 Claims, 12 Drawing Sheets

(56) References Cited

OTHER PUBLICATIONS

"Clutch Technology", Web page <https://reell.com/clutch-technology>, published at least as early as Jul. 27, 2020, retrieved Dec. 2, 2022, Reell Precision Manufacturing, Inc.
Kren, "Getting up to speed with wrap-spring clutch/brakes", Web page <https://www.machinedesign.com/motors-drives/article/21832461/getting-up-to-speed-with-wrapspring-clutchbrakes>, Jan. 25, 2007, Endeavor Business Media, LLC.
"Clutches & Brakes", Web page <https://www.servo2go.com/media/wysiwyg/pdfs/catalogs-white-papers/thomson-line/thomson-linear-clutches-brakes-catalog.pdf>, published at least as early as Jul. 27, 2020, p. 7, Thomson Industries Inc.
Extended European Search Reoprt for EP Application No. 20858110.8 dated Jul. 4, 2023.

* cited by examiner

CLUTCH SYSTEM AND METHOD OF OPERATING AN ACCESSORY SHAFT

CROSS-REFERENCE TO RELATED APPLICATIONS

This application claims the benefit of U.S. provisional application No. 62/892,155 filed Aug. 27, 2019, the contents of which are incorporated herein by reference in their entirety.

FIELD OF THE DISCLOSURE

This application relates to a clutch system for driving an accessory shaft of an accessory, in particular for a vehicle, and in particular for an air conditioning compressor driven by an accessory drive belt in a vehicle.

BACKGROUND

Accessory drive belts are used in vehicles to drive accessories such as air conditioning compressors and water pumps. While operating the vehicle it is advantageous to be able to disconnect an accessory from the accessory drive belt when it is not needed to be driven so as not to be a source of parasitic loss on the accessory drive belt. Some clutch systems in the past such as plate clutches have required a significant amount of power, in order to provide the torque to drive rotation of the accessory shaft. Some other clutch systems in the past have required lower power draws to operate, but provided very high impact loads on the components of the accessory, resulting in a higher potential for failure of these components.

There is, therefore, a need for a clutch system that provides a relatively low power draw, but which lessens the impact loads incurred by components of the driven accessory.

SUMMARY

In a first aspect, a clutch system is provided and includes a rotary input member that defines an axis, a rotary output member, an armature and a wrap spring clutch. The rotary output member is rotatable relative to the rotary input member about the axis. The rotary output member is movable from a stationary position through a first range of motion by a first torque, and is movable past the first range of motion via a second torque that is higher than the first torque. The armature is movable axially between an armature engagement position and an armature disengagement position. In the armature engagement position, the armature is frictionally rotationally engaged with the rotary input member, and in the armature disengagement position the armature is frictionally rotationally disengaged from the rotary input member. The wrap spring clutch has a first helical end, a second helical end, and a plurality of coils therebetween. The first helical end is operatively engaged with the rotary output member. The plurality of coils have a coil engagement surface that is one of a radially outer surface of the plurality of coils and a radially inner surface of the plurality of coils. The second helical end is rotationally connected to the armature. The wrap spring clutch is movable between a coil engagement position and a coil disengagement position. In the coil engagement position, the coil engagement surface is engaged with the rotary input member. In the coil disengagement position, the coil engagement surface is disengaged from the rotary input member. The wrap spring clutch is movable from the coil disengagement position to the coil engagement position via a coil engagement torque that is higher than the first torque but is lower than the second torque. When the armature is in the armature disengagement position, the wrap spring clutch is in the coil disengagement position. When the rotary output member is stationary, resistance to rotation of the rotary output member is such that movement of the armature to the armature engagement position drives not more than the first torque from the rotary input member to the armature, from the armature to the second helical end of the wrap spring clutch, from the second helical end of the wrap spring clutch to the first helical end of the wrap spring clutch and from the first helical end of the wrap spring clutch into the rotary output member to drive the rotary output member through the first range of motion, without moving the wrap spring clutch to the coil engagement position. After completion of the first range of motion, resistance to rotation of the rotary output member increases such that torque from the armature into the second helical end of the wrap spring clutch increases sufficiently to pass through the coil engagement torque, at which point the coil engagement surface of the wrap spring clutch engages the rotary input member, whereupon torque is transferred in parallel from the armature into the second helical end of the wrap spring clutch and also from the rotary input member into the wrap spring clutch via the coil engagement surface so as to transmit the second torque through the wrap spring clutch into the rotary output member.

In another aspect, a clutch system is provided and includes a rotary input member, a rotary output member, an armature and a wrap spring clutch. The rotary input member defines an axis. The rotary output member is rotatable relative to the rotary input member, about the axis. The rotary output member is movable from a stationary position through a first range of motion. The armature is movable axially between an armature engagement position and an armature disengagement position. In the armature engagement position, the armature is frictionally rotationally engaged with the rotary input member, and in the armature disengagement position the armature is frictionally rotationally disengaged from the rotary input member. The wrap spring clutch has a first helical end, a second helical end, and a plurality of coils therebetween, wherein the first helical end is operatively engaged with the rotary output member, wherein the plurality of coils have a coil engagement surface that is one of a radially outer surface of the plurality of coils and a radially inner surface of the plurality of coils. The second helical end is rotationally connected to the armature. The wrap spring clutch is movable between a coil engagement position and a coil disengagement position. In the coil engagement position, the coil engagement surface is engaged with the rotary input member, and wherein in the coil disengagement position, the coil engagement surface is disengaged from the rotary input member. When the armature is in the armature disengagement position, the wrap spring clutch is in the coil disengagement position. When the armature is in the armature engagement position torque is transferred initially from the rotary input member into the second helical end of the wrap spring clutch, helically through the wrap spring clutch from the second helical end of the wrap spring clutch to the first helical end of the wrap spring clutch, and from the first helical end of the wrap spring clutch into the rotary output member to drive the rotary output member through the first range of motion without moving the wrap spring clutch to the coil engagement position. Beyond the first range of motion while the armature is in the armature engagement position, the wrap spring clutch is moved to the coil engagement position, such that torque is transferred at least in part from the rotary input member into the wrap spring clutch through the coil engagement surface, at least in part from the coil engagement surface through the wrap spring clutch to the first helical end of the wrap spring clutch, and from the first helical end of the wrap spring clutch into the rotary output member to drive the rotary output member.

In another aspect, a method of driving an accessory shaft of an accessory, is provided and includes:
  a) providing a clutch system that includes a rotary input member, a rotary output member that is operatively connected to the accessory shaft, and a wrap spring clutch having a first helical end, a second helical end, and a plurality of coils therebetween, wherein the first helical end is operatively engaged with the rotary output member, wherein the plurality of coils have a coil engagement surface that is one of a radially outer surface of the plurality of coils and a radially inner surface of the plurality of coils, wherein the second helical end is rotationally connected to the armature;
  b) moving the armature to engage the rotary input member so as to drive the armature rotationally;
  c) transmitting a first torque from the rotary input member to the armature, from the armature to the second helical end of the wrap spring clutch, from the second helical end of the wrap spring clutch to the first helical end of the wrap spring clutch and from the first helical end of the wrap spring clutch into the rotary output member to drive the rotary output member through the first range of motion, without moving the wrap spring clutch to the coil engagement position, thereby initiating rotation of the rotary output member from a stationary position without engagement of the coil engagement surface of the wrap spring clutch with the rotary input member;
  d) after step c), transmitting a coil engagement torque that is higher than the first torque, thereby driving the coil engagement surface of the wrap spring clutch to engage the rotary input member; and
  e) after step d), transmitting a second torque that is higher than the coil engagement torque to drive the accessory shaft to carry out an operation of the accessory.

In another aspect, the disclosure relates to a clutch system that includes a rotary input member, a wrap spring clutch and a rotary output member. The wrap spring clutch has a first helical end, a second helical end, and a plurality of coils with a coil engagement surface thereon. The stiffness of the wrap spring clutch is selected such that, when transmitting a torque that is less than a selected coil engagement torque, the clutch system transmits torque helically from the rotary input member, to the second helical end, helically through the wrap spring clutch to the first helical end, and into the rotary output member to drive movement of the rotary output member. When transmitting a torque that is greater than the selected coil engagement torque, the clutch system transmits torque in parallel from the rotary input member, to the second helical end, helically through the wrap spring clutch to the first helical end, and into the rotary output member, and from the rotary input member through the coil engagement surface, to the first helical end, and into the rotary output member.

BRIEF DESCRIPTION OF DRAWINGS

The foregoing and other aspects of the disclosure will be better understood with reference to the attached drawings, wherein.

DETAILED DESCRIPTION

Figure 1A:
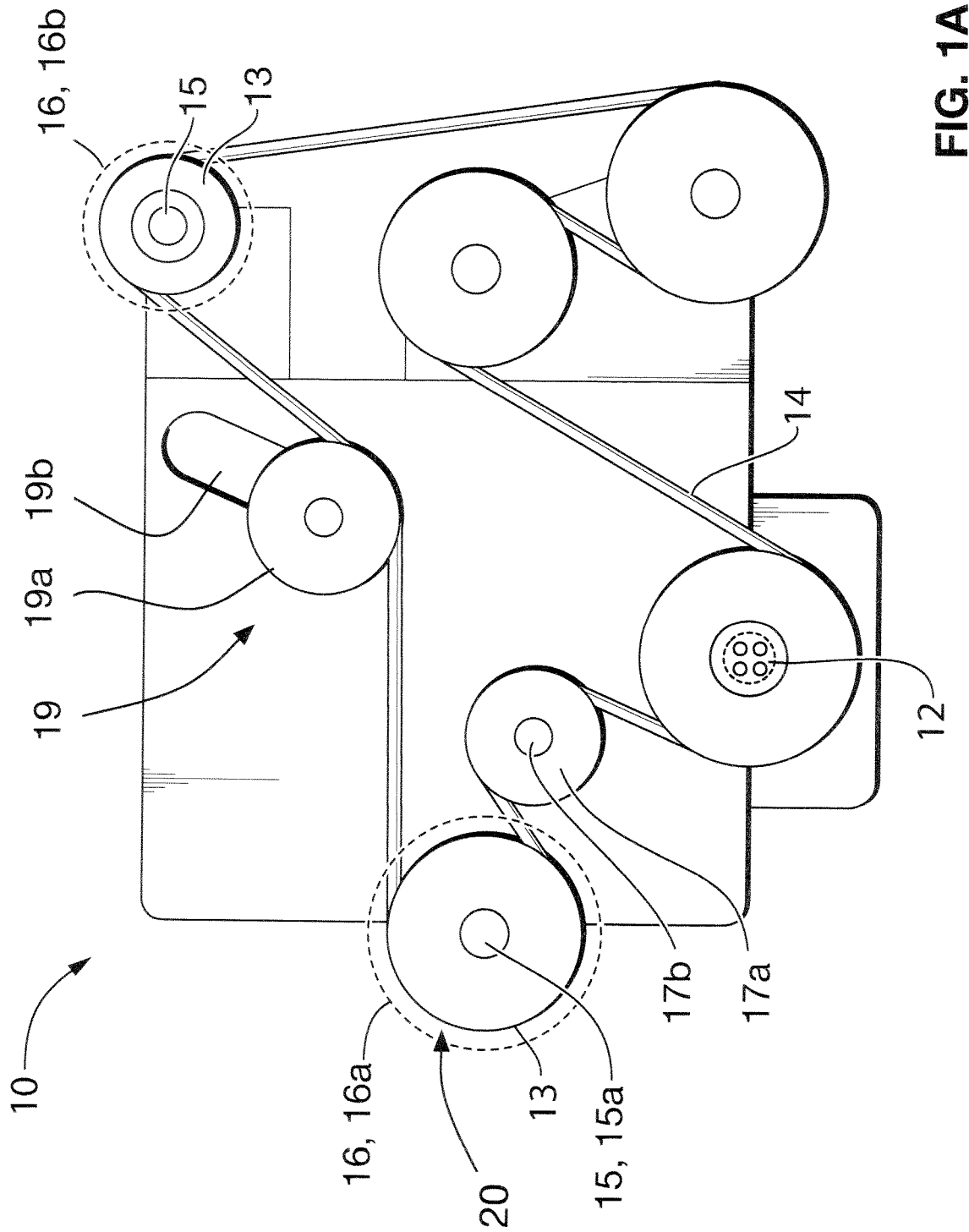
FIG. 1A is an elevation view of a vehicle engine with an accessory drive system with a clutch system in accordance with an embodiment of the present disclosure.

For simplicity and clarity of illustration, where considered appropriate, reference numerals may be repeated among the drawings to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the drawings and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Reference is made to FIG. 1A, which shows an engine 10 for a vehicle. The engine 10 includes a crankshaft 12 which drives an endless drive element, which may be, for example, a belt 14. Via the belt 14, the engine 10 drives a plurality of accessories 16 (shown in dashed outlines), such as an air conditioning compressor (shown individually at 16a) and a motor/generator unit (MGU) (shown individually at 16b). The belt 14 may thus be referred to as an accessory drive belt 14. Each accessory 16 includes an accessory shaft 15 with a pulley 13 thereon, which is driven by the belt 14. Additionally, shown in the present embodiment is an idler pulley shown at 17a on an idler shaft 17b, and a tensioner pulley 19a rotatably mounted on a tensioner arm 19b, which form part of a belt tensioner 19. The functions of the idler pulley 17a and the belt tensioner 19 are well known to one of skill in the art.

A clutch system 20 may be provided instead of a simple pulley in one or more places to permit control over whether torque is transferred from the crankshaft 12 to one or more of the accessory shafts 15. In FIG. 1, the clutch system 20 is provided on the accessory shaft shown at 15a, for the air conditioning compressor 16a. The accessory shaft 15a may also be referred to as a compressor shaft 15a since in the embodiment shown, the accessory is a compressor. The clutch system 20 is advantageous over some clutch systems of the prior art in that the clutch system 20 employs a wrap spring clutch but engages the wrap spring clutch in a controlled manner so as to inhibit damage to the components of the accessory that could otherwise result from a clutch engagement that is too quick.

Figure 1B:
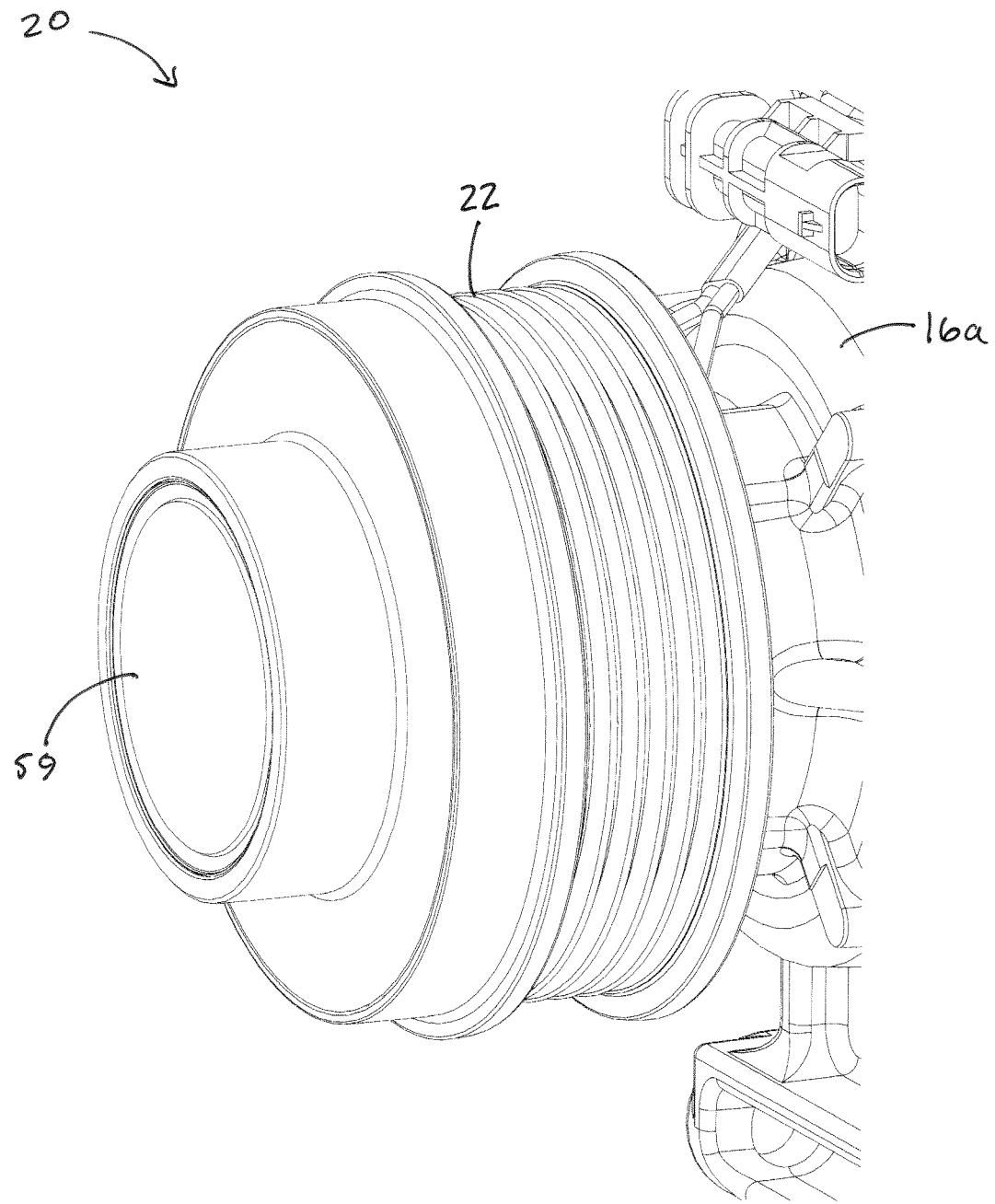
FIG. 1B is a perspective view of the clutch system shown in FIG. 1.
Figure 2:
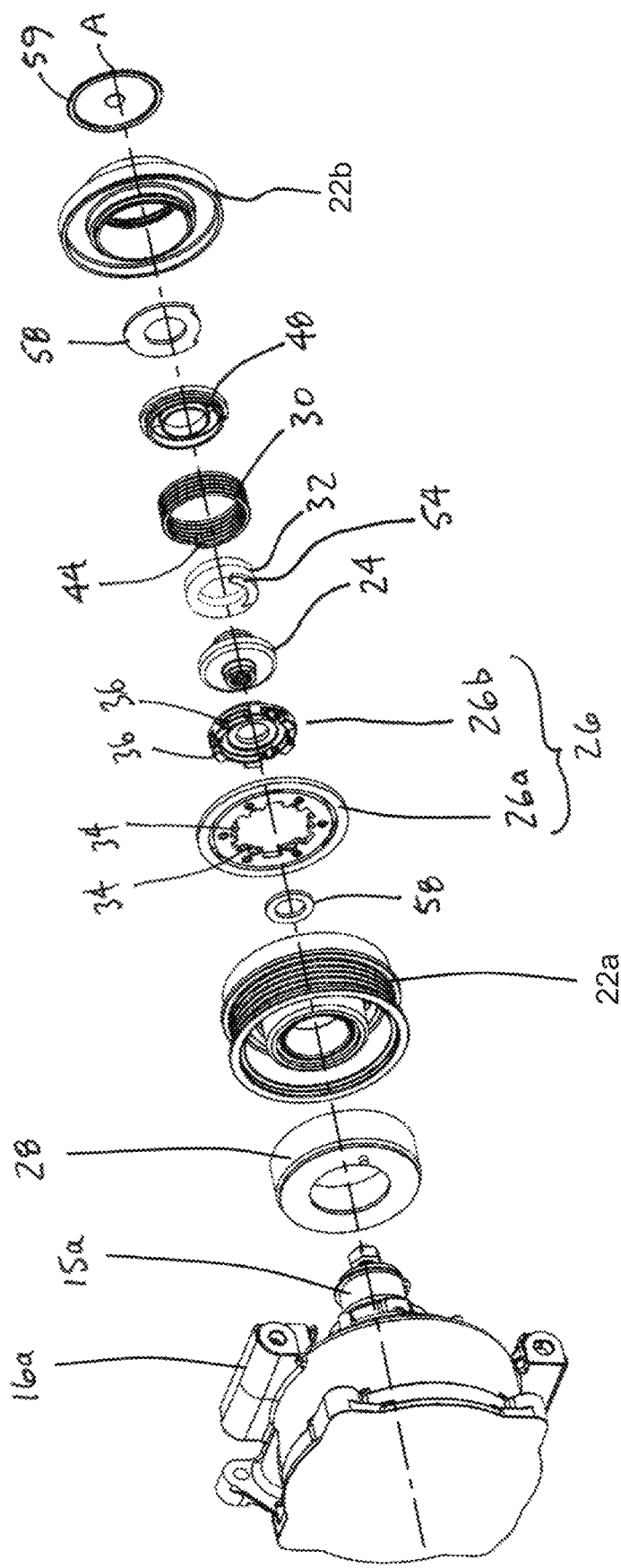
FIG. 2 is a perspective exploded view of the clutch system shown in FIG. 1.
Figure 3:
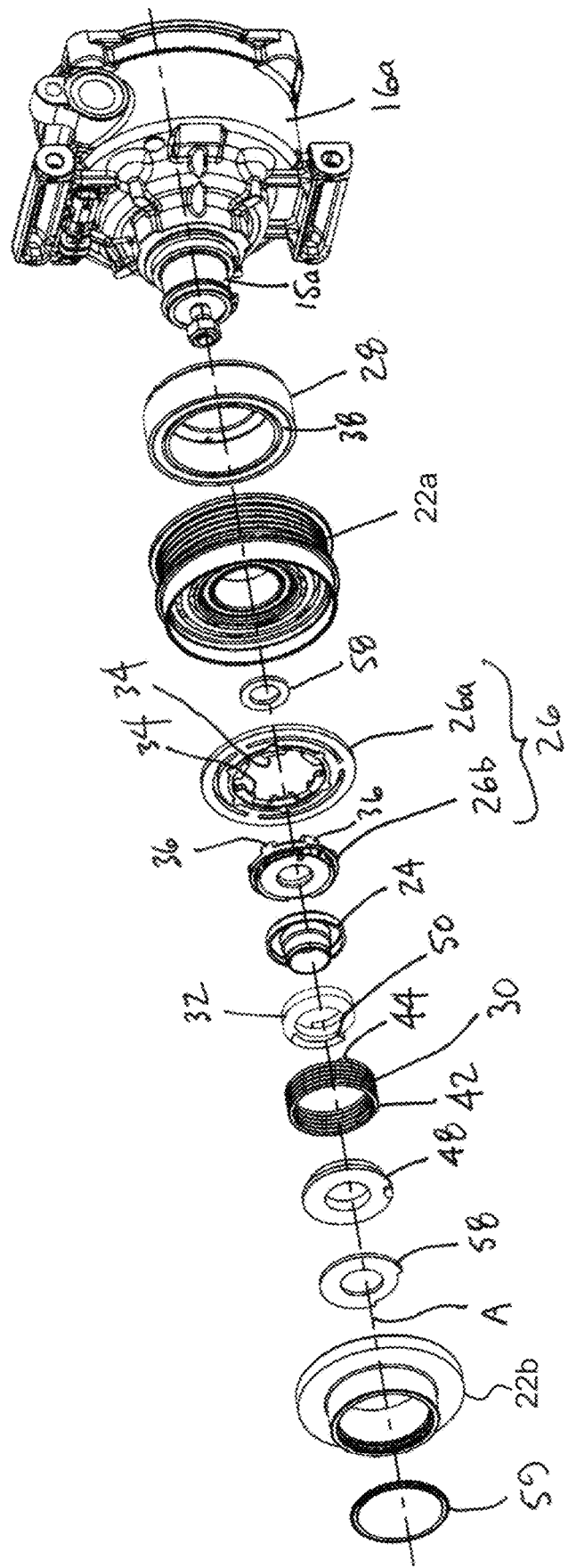
FIG. 3 is another perspective exploded view of the clutch system shown in FIG. 2.
Figure 4A:
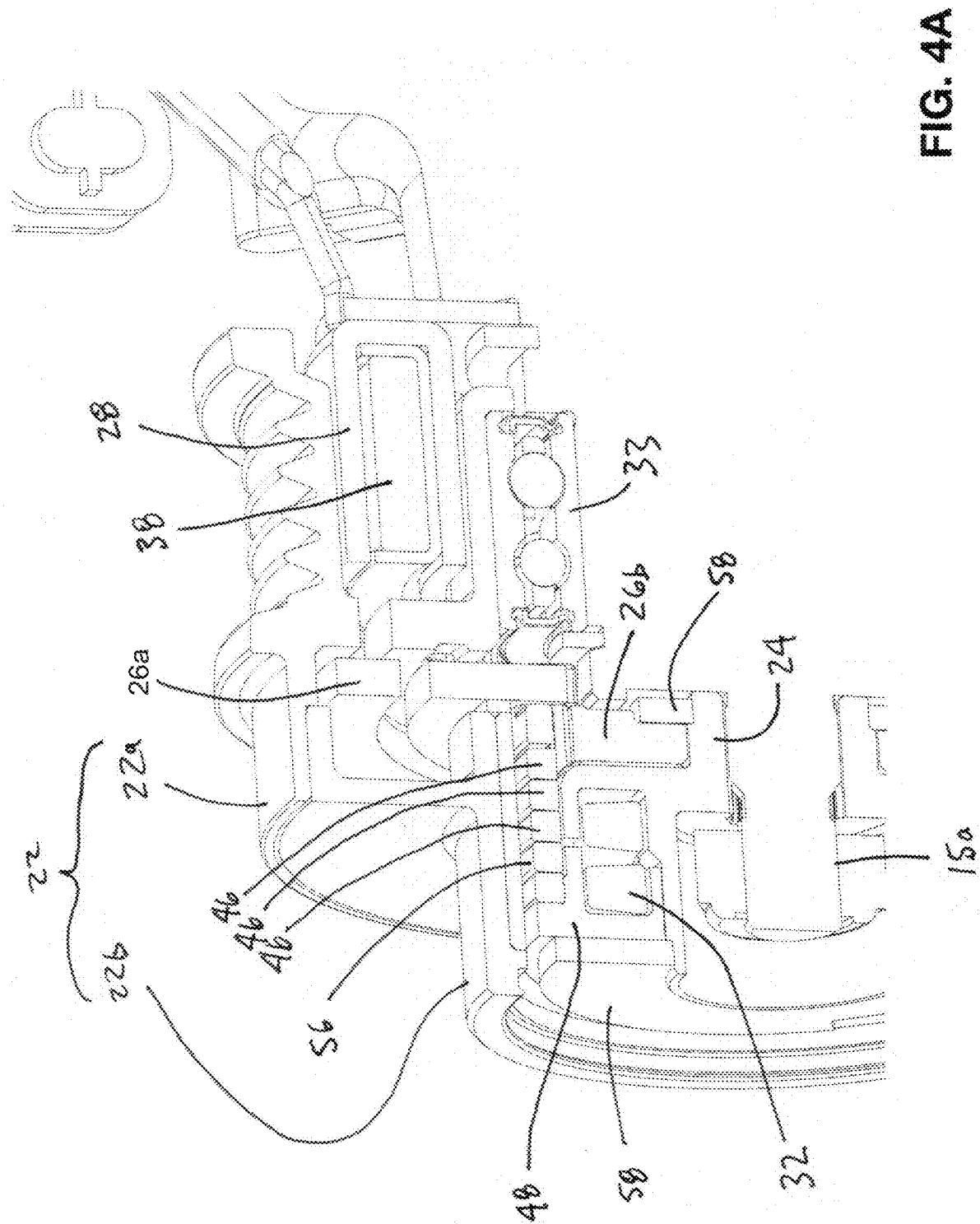
FIG. 4A is a perspective sectional view of the clutch system shown in FIG. 2 in a first position.
Figure 4B:
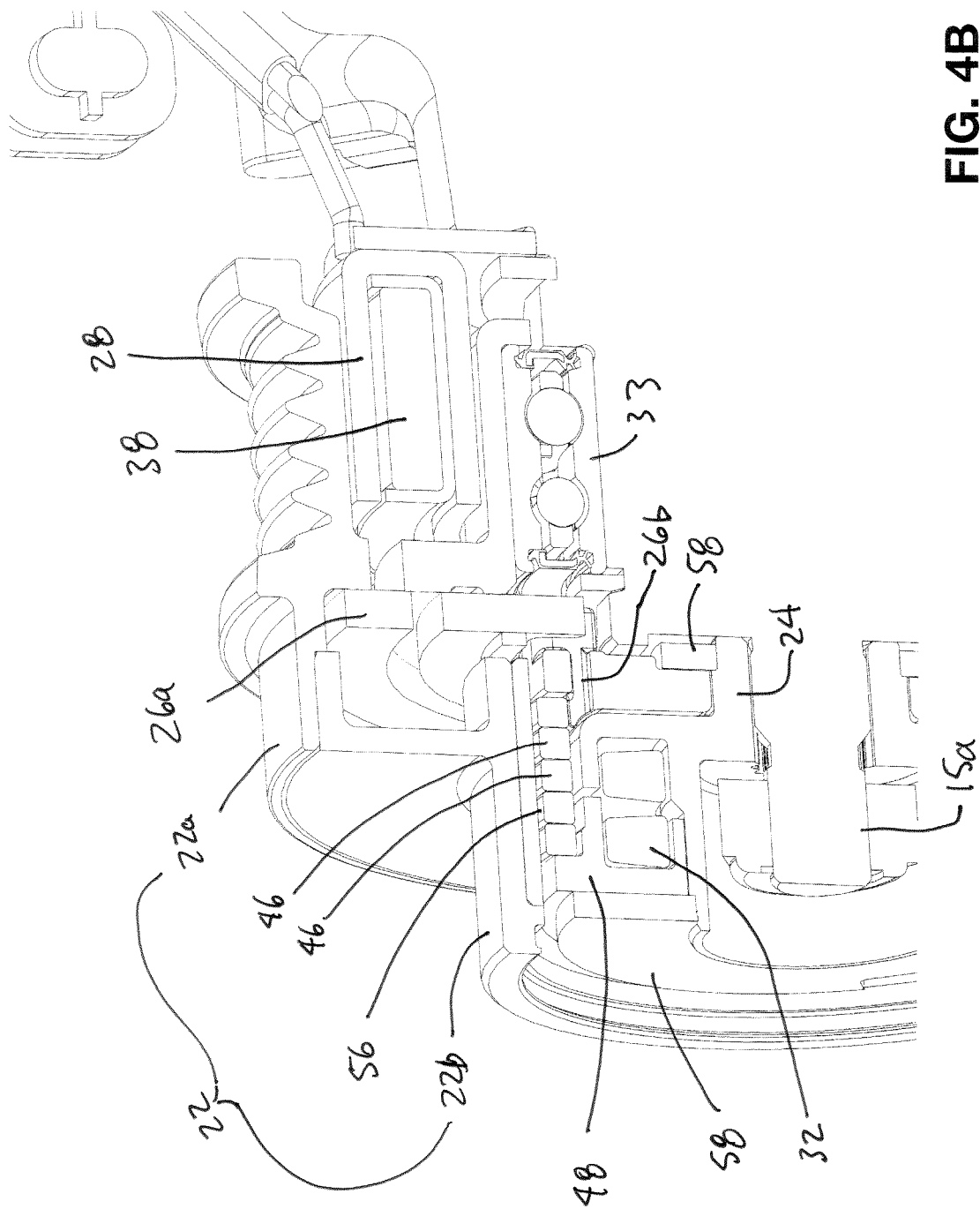
FIG. 4B is a perspective sectional view of the clutch system shown in FIG. 2 in a second position.
Figure 4C:
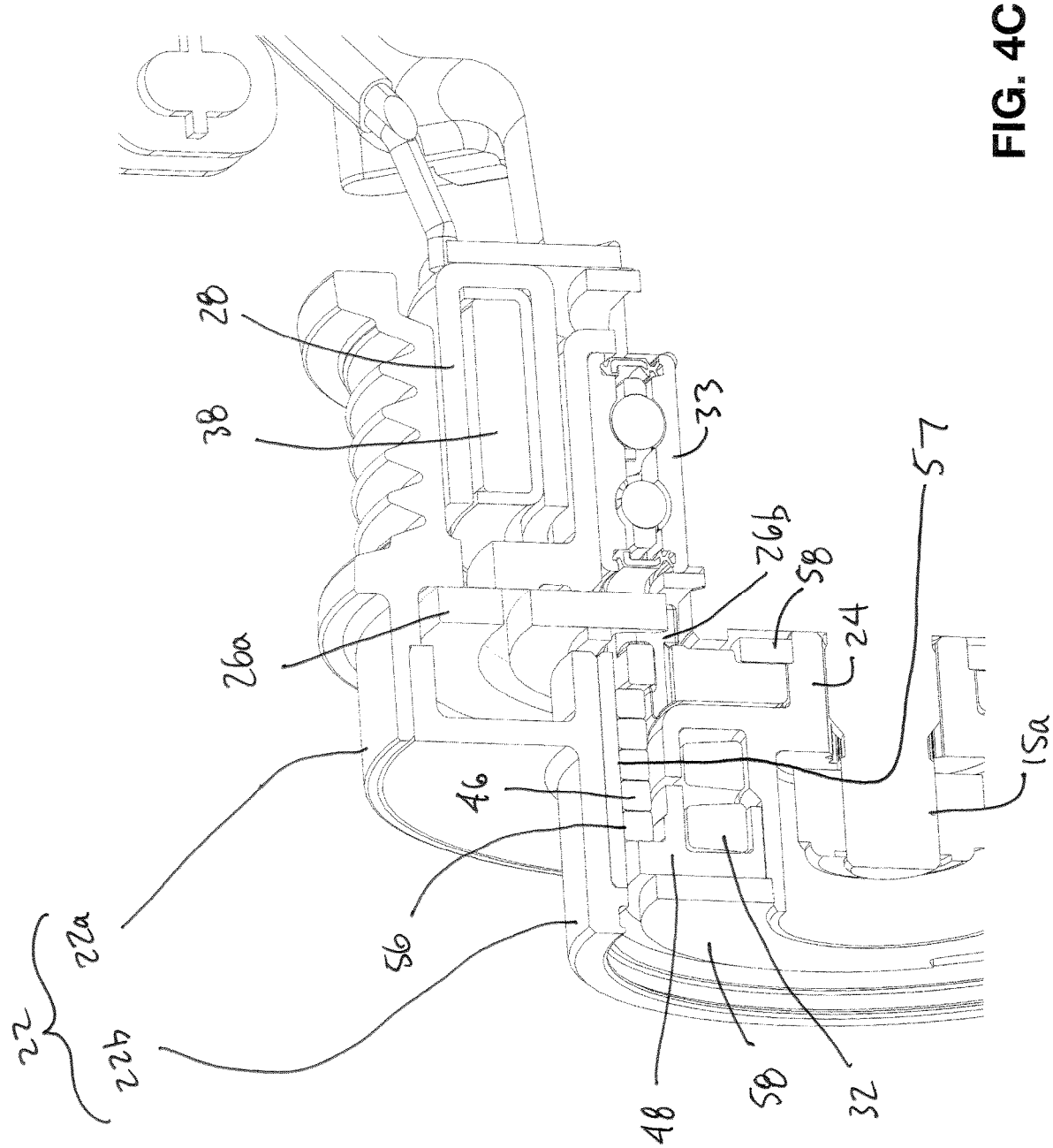
FIG. 4C is a perspective sectional view of the clutch system shown in FIG. 2 in a third position.

FIG. 1B is a magnified perspective view of the clutch system shown in FIG. 1. FIGS. 2 and 3 are exploded views of the clutch system 20, and FIGS. 4A-4C are sectional views of the clutch system 20 in different positions. Referring to FIGS. 2, 3 and 4A-4C, the clutch system 20 includes a rotary input member 22 that defines an axis A, a rotary output member 24 that is rotatable relative to the rotary input member 22 about the axis A, an armature 26, an actuator 28, a wrap spring clutch 30, and, optionally, an isolation spring 32. In the example embodiment shown, the rotary input member 22 is a pulley (shown at 22a) and further includes a pulley extension member 22b) that is driven by the belt 14, and the rotary output member 24 is a hub that is shaped to mount to the accessory shaft 15 of the accessory 16 (e.g. the accessory shaft 15 of the air conditioning compressor 16a), that is to be driven by the belt 14. A bearing 33 may be provided to rotatably support the rotary input member 22 on the accessor shaft 15a.

The armature 26 is movable axially between an armature engagement position (shown in FIGS. 4B and 4C) and an armature disengagement position (FIG. 4A). In the armature engagement position, the armature 26 is rotationally engaged with the rotary input member 22. In the armature disengagement position the armature 26 is rotationally disengaged from the rotary input member 20.

The armature 26 in the present example includes a first armature portion 26a and a second armature portion 26b. The first armature portion 26a is rotationally connected to the second armature portion 26b via a series of interlocking teeth 34 and 36 on the first and second armature portions 26a and 26b respectively. The first armature portion 26a is axially slidable (along the second armature portion 26b) between a first position in which it is frictionally rotationally engaged with the rotary input member 22 and a second position in which it is axially spaced from and therefore rotationally disengaged from the rotary input member 22. The second armature portion 26b need not be axially slidable, but does rotationally connects the armature with the wrap spring clutch 30. The second armature portion 26b may be supported on the rotary output member 24 but is not directly rotationally connected to the rotary output member 24. In other words, the second armature portion 26b is supported on the rotary output member 24 but relative rotational movement is permitted between the second armature portion 26b and the rotary output member 24.

The actuator 28 is energizable and deenergizable, which causes movement of the armature 26 to the armature engagement position and armature disengagement position. One of energizing and deenergizing of the actuator 28 drives movement of the armature 26 to the armature engagement position and the other of energizing and deenergizing of the actuator 28 drives movement of the armature to the armature disengagement position. In the embodiment shown, energizing of the actuator 28 drives movement of the armature 26 to the armature engagement position and deenergizing of the actuator 28 drives movement of the armature 26 to the armature disengagement position. A spring or other biasing element may optionally be provided to assist in biasing the armature 26 towards the armature disengagement position if beneficial.

The actuator 28 may be energized and deenergized by any suitable means. In the embodiment shown, the actuator 28 includes an electromagnetic coil 38 and is energizable via an electric current (through electrical conductors shown at 40). The actuator 28 could alternatively be energized and deenergized by any other suitable means. For example, the actuator 28 could be a pneumatic or hydraulic actuator that uses compressed air or hydraulic oil to drive mechanical movement of the armature 26, and is thus energized and deenergized using compressed air or hydraulic oil.

The wrap spring clutch 30 transfers torque between the rotary input member 22 and the rotary output member 24. In the embodiment shown, the wrap spring clutch 30 has a first helical end 42, a second helical end 44, and a plurality of coils 46 therebetween. The first helical end 42 is operatively engaged with the rotary output member 24. In the embodiment shown, the first helical end 42 is held in a carrier shown at 48, which is itself connected to a first helical end 50 of the isolation spring 32. The carrier 48 may be any suitable carrier known in the art and may be configured to hold the first helical end 42 of the wrap spring clutch 30 in direct engagement with the first helical end 50 of the isolation spring 32. A second helical end, shown at 54, of the isolation spring 32 is connected to the rotary output member 24. When torque is transmitted through the first helical end 42 of the wrap spring clutch 30, it is transmitted to the first helical end 50 of the isolation spring 32, through the isolation spring 32 to the second helical end 52 thereof, and from the second helical end 52 thereof into the rotary output member 24. Thus, it will be understood that the operative engagement of the first helical end 42 with the rotary output member 24, need not be a direct engagement.

In the embodiment shown, the isolation spring 32 is a helical torsion spring. In an alternative embodiment, however, the isolation spring 32 may be any other suitable type of spring, such as a helical compression spring which has first and second axial ends, in which case the first helical end 42 of the wrap spring clutch 30 may abut a wall which in turn abuts a first axial end of the isolation spring 32 and a second axial end of the isolation spring 32 would engage and transmit torque into the rotary output member.

The plurality of coils 46 of the wrap spring clutch 30 together have a coil engagement surface 56, that is one of a radially outer surface of the plurality of coils 46 and a radially inner surface of the plurality of coils 46. In the embodiment shown, the coil engagement surface 56 is the radially outer surface of the plurality of coils 46. The wrap spring clutch 30 is movable between a coil engagement position (FIG. 4C) and a coil disengagement position (FIGS. 4A and 4B). In the coil engagement position, the coil engagement surface 56 is engaged with the rotary input member 22. In the embodiment shown, the coil engagement surface 56 is engaged with a radially inner surface 57 of the rotary output member 22. In an alternative embodiment in which the coil engagement surface 56 is a radially inner surface of the plurality of coils 46, it would engage a radially outer surface of the rotary output member 22.

In the coil disengagement position, the coil engagement surface 56 is spaced from, and therefore disengaged from, the rotary input member 22. The wrap spring clutch has a selected stiffness, based on its material of construction and other factors, such as the cross-sectional dimensions of the wire from which the wrap spring clutch 30 may be formed. The wrap spring clutch 30 is movable from the coil disengagement position to the coil engagement position via a coil engagement torque, Tce. The coil engagement torque Tce is described further below.

The second helical end 44 wrap spring clutch 30 is rotationally connected to the armature 26. In the embodiment shown, the second armature portion 26b has a slot 60, and the second helical end 44 of the wrap spring clutch 30 is bent to form a tang that fits in the slot 60, thereby connecting the second helical end 44 rotationally with the armature 26.

In the embodiment shown, when the armature 26 is in the armature disengagement position (FIGS. 4A and 4B), the wrap spring clutch 30 is in the coil disengagement position. Conversely, when the armature 26 is in the armature engagement position (FIGS. 4A and 4B), the wrap spring clutch 30 may be in the coil disengagement position, as described in more detail below.

Retainers shown at 58 may be provided as appropriate to hold elements of the clutch system 20 axially in place. A cover 59 may also be provided so as to inhibit dirt from migrating into the clutch system 20.

Figure 5A:
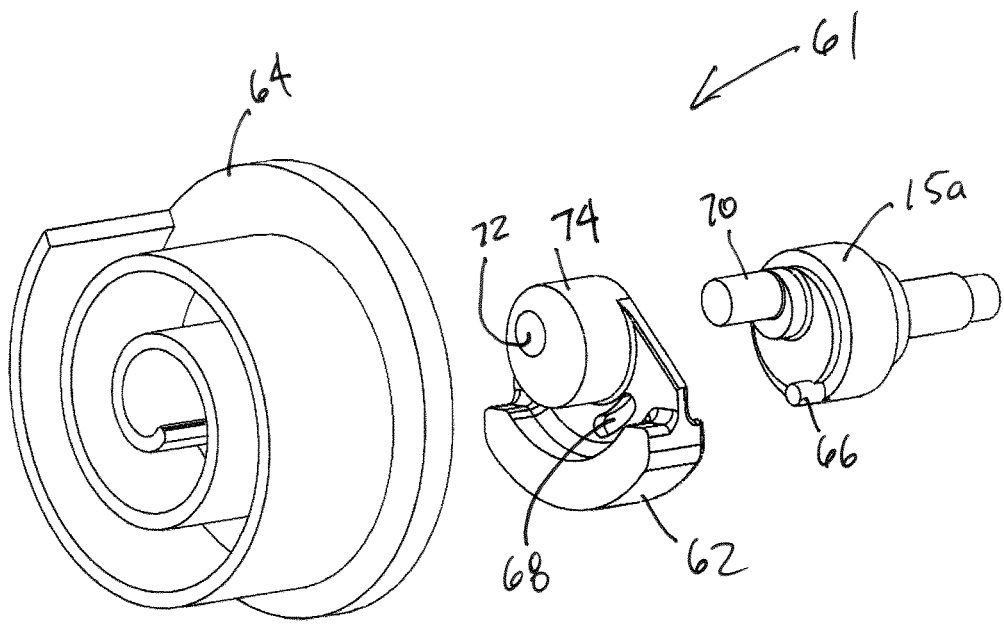
FIGS. 5A and 5B are perspective exploded views of an accessory input system driven by the clutch system shown in FIG. 2.
Figure 5B:
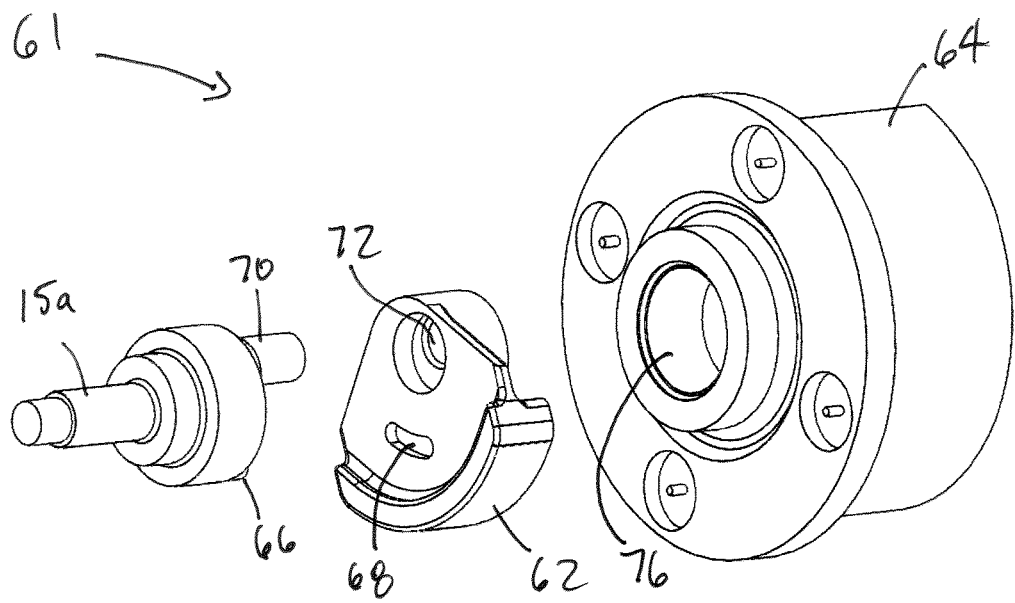

FIGS. 5A and 5B show exploded views of an accessory input structure 61 that includes a plurality of rotatable accessory elements of the air conditioning compressor 16a. The rotatable accessory elements shown in FIGS. 5A and 5B include the accessory shaft 15a, a counter-balance 62, and a scroll 64. Since the rotary output member 24 is fixedly connected to the accessory shaft 15a, the rotary output member 24 may be said to be operatively connected the accessory input structure 61.

Figure 6A:
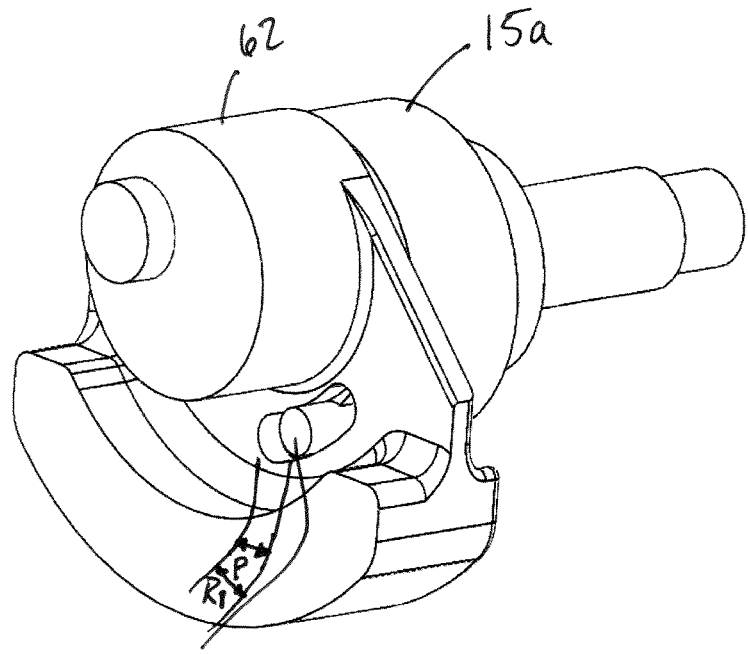
FIGS. 6A and 6B are perspective views of portions of the accessory input system shown in FIGS. 5A and 5B in first and second positions.

FIG. 6A shows the accessory shaft 15a and the counter-balance 62 when the accessory shaft 15a is in a stationary position. As can be seen, the accessory shaft 15a includes a pin 66 that engages a slot 68 in the counter-balance 62. The accessory shaft 15a has a shaft bearing surface 70 that is supported by a shaft support surface 72 in the counter-balance 62. The counter-balance 62 itself has a counter-balance bearing surface 74 that is supported in a counter-balance support surface 76 of the scroll 64.

Initially, there is a selected amount of play between the rotatable accessory elements. In the embodiment shown, the play (shown at P in FIG. 6A) is between the pin 66 and the end of the slot 68.

Figure 6B:
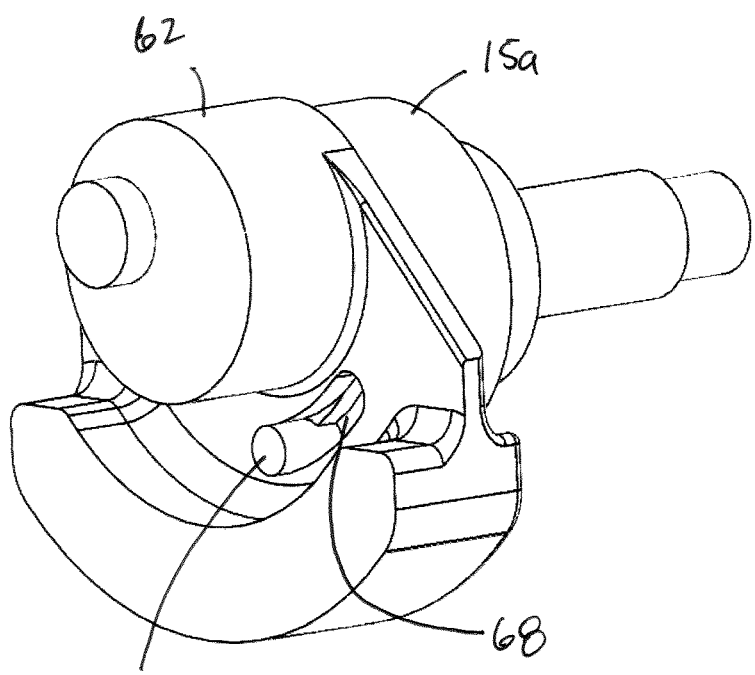

When the accessory shaft 15a is rotated away from its stationary position shown in FIG. 6A, there is no movement of the counter-balance 62 or the scroll 64 until the lost motion provided by the play P is taken up (i.e. until the pin 66 reaches the end of the slot 68) (as is shown in FIG. 6B). However, due to resistive forces that exist, for example, because of such things as friction between seals and sealing faces of certain components in the air conditioning compressor 16a, a first torque T1 is needed to drive the accessory shaft 15a through a first range of motion R1 to take up the play P.

The coil engagement torque Tce is advantageously higher than the first torque T1. FIG. 4A shows the clutch system 20 when the rotary output member 24 is stationary and the armature 26 is in the armature disengagement position. Accordingly, no torque is being transferred through the clutch system 20. When the rotary output member 24 is stationary, resistance to rotation of the rotary output member 22 (by virtue of the aforementioned friction between seals and sealing faces, for example), is such that movement of the armature 26 to the armature engagement position (FIG. 4B) drives not more than the first torque T1 from the rotary input member 22 to the armature 26, from the armature 26 to the second helical end 44 of the wrap spring clutch 30, from the second helical end 44 of the wrap spring clutch 30 to the first helical end 42 of the wrap spring clutch 30 and from the first helical end 42 of the wrap spring clutch 30 into the rotary output member 24 to drive the rotary output member 24 through the first range of motion R1. Because the coil engagement torque Tce is higher than the first torque T1, the aforementioned torque transfer through the armature 26, the wrap spring clutch 30 and the rotary output member 24 without moving the wrap spring clutch 30 to the coil engagement position. Thus, movement of the rotary output member 24 through the first range of motion R1 drives the plurality of rotatable components sufficiently to eliminate of the selected amount of play P between the rotatable accessory elements prior to movement of the wrap spring clutch 30 to the coil engagement position.

As can be seen in FIG. 4B, the transfer of the first torque T1 through the wrap spring clutch 30 causes radial expansion of the wrap spring clutch 30, but not a sufficient amount of expansion to cause engagement of the coil engagement surface 56 with the rotary input member 22. The torque transfer through the wrap spring clutch 30 in FIG. 4B is similar to that through a helical torsion spring such as the isolation spring 32.

Figure 7:
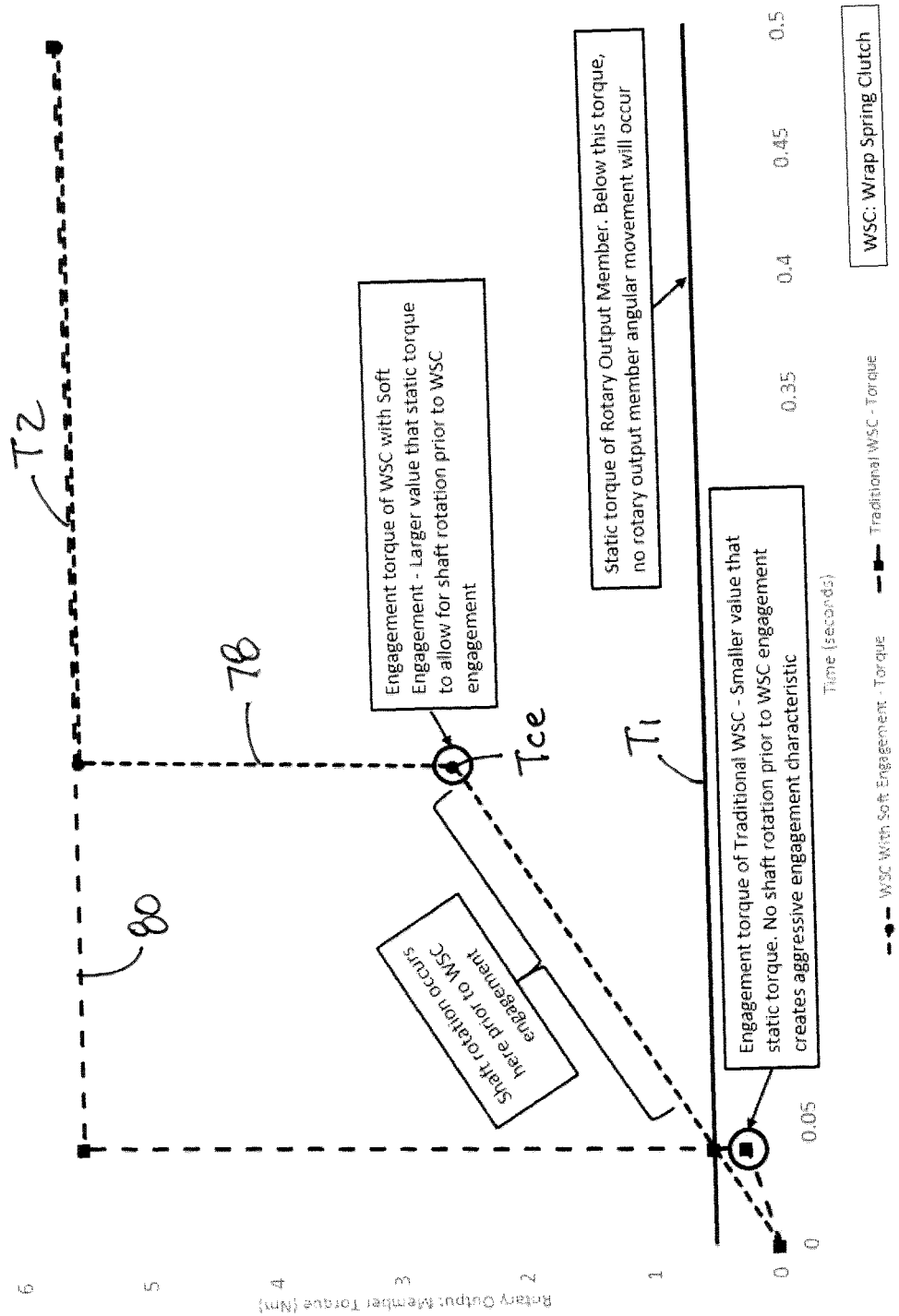
FIG. 7 is a graph illustrating torque transfer through the clutch system shown in FIG. 2.

Once the first range of motion R1 is completed, the accessory shaft 15a, and therefore the rotary output member 24, must drive the counter-balance 62 and the scroll 64, and compression of the refrigerant by the scroll 64 begins, thereby increasing the resistive torque on the rotary output member 24. Accordingly, the torque needed to drive the rotary output member 24 increases. As the scroll 64 is further driven, the work that it does to compress refrigerant increases, and so the resistive torque increases. A graph illustrating the resistive torque based on time is shown in FIG. 7. Curve 78 shows the resistive torque for the clutch system 20. Curve 80 shows the resistive torque for a prior art clutched pulley for comparison purposes. As the resistive torque increases (i.e. as the resistance to rotation of the rotary output member 24 increases), the torque transfer from the armature 26 into the second helical end 44 of the wrap spring clutch 30 increases eventually being sufficient to pass through the coil engagement torque Tce, at which point the plurality of coils 46 of the wrap spring clutch 30 have expanded radially sufficiently that the coil engagement surface 56 engages the rotary input member 22. At this point, torque is transferred in parallel from the rotary input member to the armature 26 and from the armature 26 into the second helical end 44 of the wrap spring clutch 30, and also from the rotary input member 22 into the wrap spring clutch 30 via the coil engagement surface 56. Upon engagement of the coil engagement surface 56 with the rotary input member 22, the capability of the rotary input member 22 to transmit torque to the rotary output member 24 increases. As can be seen in FIG. 7, the torque transferred through the wrap spring clutch 30 into the rotary output member 24 increases to reach a second torque T2, which is higher than the coil engagement torque Tce. Thus, the coil engagement torque Tce is higher than the first torque T1, but is lower than the second torque T2. It will be noted that curve 78 in FIG. 7 is a representation of the torque transfer that that would be predicted to take place through the clutch system 20 in a hypothetical application, and is not a graph of actual measurements. The second torque T2 is reached at a point that is past the first range of motion R1. As can be seen in FIG. 7, the first torque T1 which is applied to move the rotary output member through the first range of motion R1 may be, for example, 0.8 Nm. The coil engagement torque Tce selected for the wrap spring clutch 30 may be, for example, 2.5 Nm.

By configuring the wrap spring clutch 30 such that the coil engagement torque Tce is higher than the first torque T1, the accessory shaft 15a is driven to start rotating before the plurality of coils 46 of the wrap spring clutch 30 engage the rotary input member 22. As a result, when the play P is taken up between the rotary output member 24 and the scroll 64 of the air conditioning compressor 16a, some of the torque that is applied through the wrap spring clutch 30 to the rotary output member 24 goes towards expanding the wrap spring clutch 30 radially. While the wrap spring clutch 30 is expanding radially, the second helical end 44 can rotate relative to the first helical end 42, and so the first helical end 42 is accelerated more slowly than the second helical end 44. As a result, when the compressor shaft 15a has rotated sufficiently to drive the pin 66 to the end of the slot 68 the angular speed of the compressor shaft 15a is lower than it would be if the plurality of coils 64 were engaged with the rotary input member 22. By contrast, in some clutched pulleys of the prior art, the wrap spring clutch of the prior art has a stiffness selected such that the wrap spring clutch expands radially at a very low torque such that its coil engagement surface engages the rotary input member (e.g. a pulley) prior to movement of the rotary output shaft away from its stationary position. The point at which engagement of the wrap spring clutch represented by the curve 80 may be, for example, 0.5 Nm. As a result, the first helical end of such a wrap spring clutch is necessarily moving at the same speed as the second helical end as soon as engagement occurs, since the engagement of the coils with the rotary input member means that there is no room for further radial expansion. As a result, the angular speed of the compressor shaft 15a in such a scenario matches the angular speed of the rotary input member and so the pin 66 on such a compressor shaft is driven into the end of the slot 68 at a higher speed than with the clutch system 20. It has been found that such high impact speeds by the compressor shaft 15a when using prior art clutch pulleys can result in mechanical failure of certain components of the compressor 15a, such as the counter-balance. By selecting the coil engagement torque Tce to be higher than the first torque T1, the speed at which the pin 66 engages the end of the slot 68 is reduced.

The second torque reached by the clutch system 20 may be any suitable torque. For example, the curve 78 is shown reaching a second torque T2 of 5.5 Nm. In other embodiments, the second torque T2 could be, for example, 20 Nm, or any other suitable value, depending on the particular accessory is being driven and the specific application. Thus, it will be noted that the clutch system 20 permits a torque of 20 Nm or more to be transferred to an accessory shaft 15a while only requiring a holding torque of, for example, 2.5 Nm to hold the armature 26 to the rotary input member 22, thereby providing relatively low power consumption, while reducing the potential for failure of a component of the accessory 16a.

Figure 8:
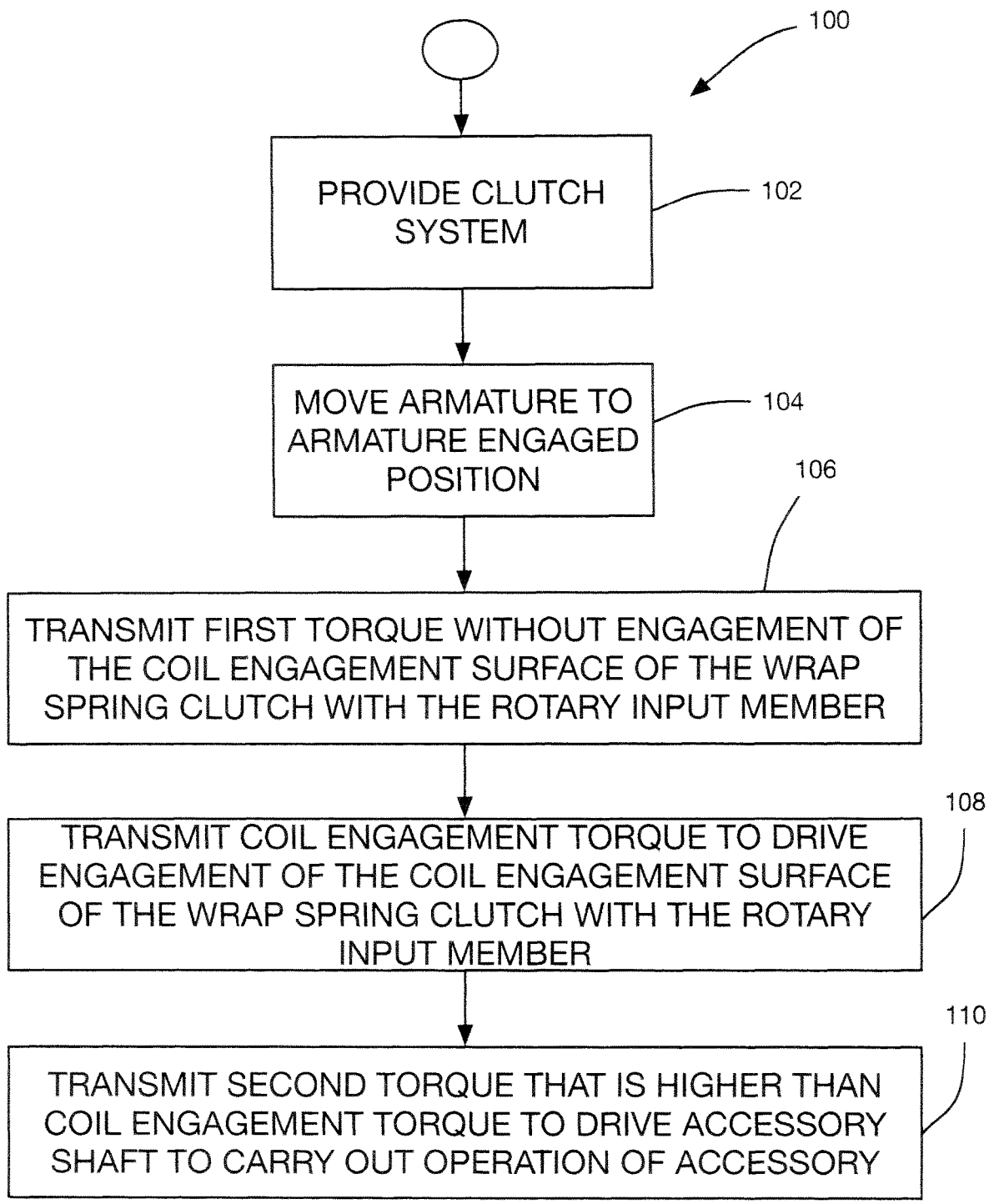
FIG. 8 is a flow diagram illustrating a method of operating an accessory shaft of an accessory in accordance with another embodiment of the present disclosure.

The operation of the clutch system 20 may be characterized by a method, shown at 100 in FIG. 8. The method 100 may be referred to as a method of driving an accessory shaft 15a of an accessory (e.g. the air conditioning compressor 16a). The method includes a step 102 which is providing a clutch system (e.g. the clutch system 20) that includes the rotary input member 22, the rotary output member 24 that is operatively connected to the accessory shaft 15a, and the wrap spring clutch 30 having the first helical end 42, the second helical end 44, and the plurality of coils 46 therebetween, wherein the first helical end 42 is operatively engaged with the rotary output member 22, wherein the plurality of coils 46 have the coil engagement surface 56 that is one of a radially outer surface of the plurality of coils and a radially inner surface of the plurality of coils 46, wherein the second helical end 44 is rotationally connected to the armature 26. The method further includes a step 104 which includes moving the armature 26 to engage the rotary input member 22 so as to drive the armature 26 rotationally. The method further includes a step 106, which includes transmitting a first torque T1 from the rotary input member 22 to the armature 26, from the armature 26 to the second helical end 44 of the wrap spring clutch 30, from the second helical end 44 of the wrap spring clutch 30 to the first helical end 42 of the wrap spring clutch 30 and from the first helical end 42 of the wrap spring clutch 30 into the rotary output member 24 to drive the rotary output member 24 through the first range of motion R1, without moving the wrap spring clutch 30 to the coil engagement position, thereby initiating rotation of the rotary output member 24 from a stationary position without engagement of the coil engagement surface 56 of the wrap spring clutch 30 with the rotary input member 22. The method 100 further includes a step 108, which takes place after step 106 and includes transmitting the coil engagement torque Tce which is higher than the first torque T1, thereby driving the coil engagement surface 56 of the wrap spring clutch 30 to engage the rotary input member 22. The method 100 further includes a step 110 which takes place after step 108, and includes transmitting the second torque T2 which is higher than the coil engagement torque Tce to drive the accessory shaft 15a to carry out an operation of the accessory.

It will be understood that the method 100 may be carried out with any suitable clutch system and is not intended to be limited specifically to being carried out with the clutch system 20.

In other embodiments, the armature 26 may be a single contiguous element that has a slot 60 of sufficient depth to hold the second helical end 44 of the wrap spring clutch 30 in both the armature engagement position and the armature disengagement position.

Figure 9:
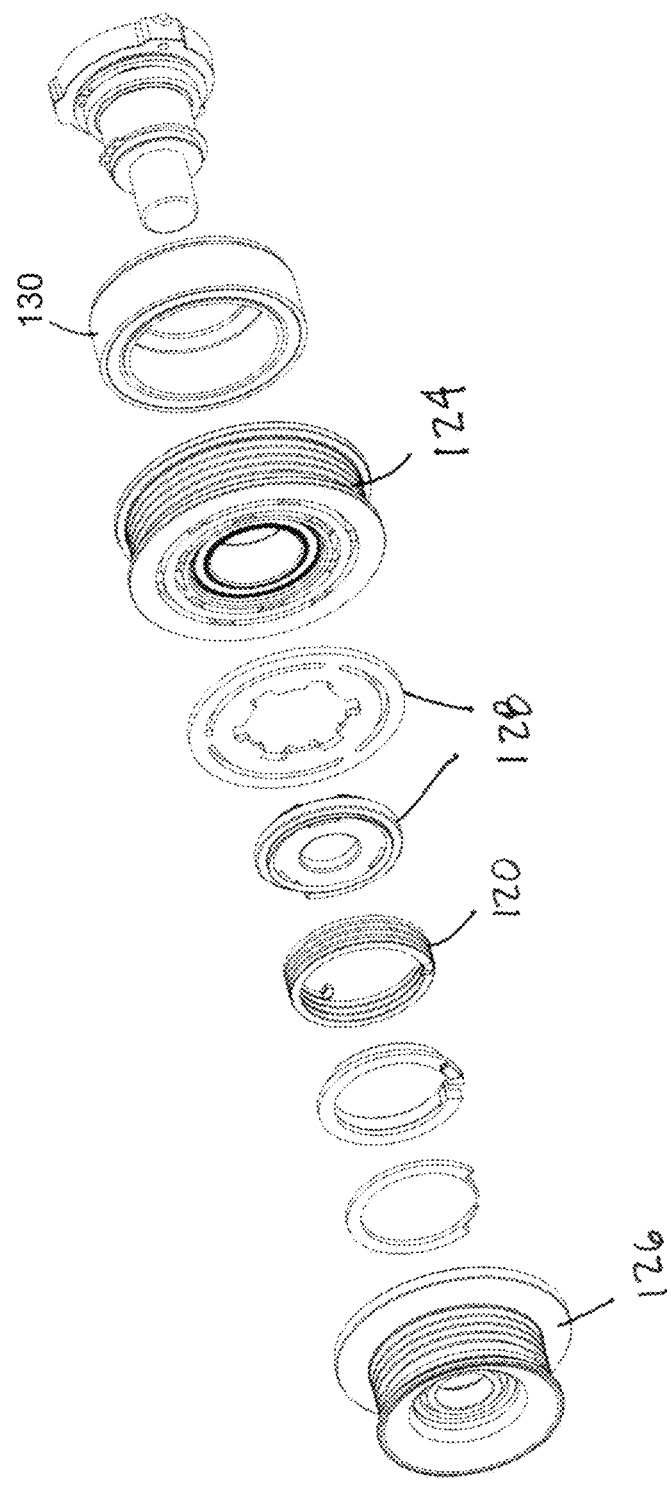
FIG. 9 is a perspective exploded view of a clutch system in accordance with another embodiment of the present disclosure.

In another embodiment, shown in FIG. 9, a dual pulley system is provided, which may be similar to the dual pulley system disclosed in PCT publication WO2019134053A1, the contents of which are incorporated herein by reference. A wrap spring clutch shown at 120 may be provided with a selected coil engagement torque in accordance with the present disclosure to control engagement of one pulley to another pulley. One skilled in the art will understand that the pulley shown at 124 may constitutes a rotary input member, while the pulley shown at 126 may constitute a rotary output member. An armature 128 which may be similar to the armature 26 is shown, and an actuator 130 is shown, which may be similar to the actuator 28.

Those skilled in the art will appreciate that the embodiments disclosed herein can be modified or adapted in various other ways whilst still keeping within the scope of the appended claims.

What is claimed is:

1. A clutch system, comprising:
   a rotary input member that defines an axis;
   a rotary output member that is rotatable relative to the rotary input member about the axis, wherein the rotary output member is movable from a stationary position through a first range of motion by a first torque, and is movable past the first range of motion via a second torque that is higher than the first torque;
   an armature that is movable axially between an armature engagement position and an armature disengagement position, wherein, in the armature engagement position, the armature is frictionally rotationally engaged with the rotary input member, and in the armature disengagement position the armature is frictionally rotationally disengaged from the rotary input member; and
   a wrap spring clutch having a first helical end, a second helical end, and a plurality of coils therebetween, wherein the first helical end is operatively engaged with the rotary output member, wherein the plurality of coils have a coil engagement surface that is one of a radially outer surface of the plurality of coils and a radially inner surface of the plurality of coils, wherein the second helical end is rotationally connected to the armature,
   wherein the wrap spring clutch is movable between a coil engagement position and a coil disengagement position, wherein, in the coil engagement position, the coil engagement surface is engaged with the rotary input member, and wherein in the coil disengagement position, the coil engagement surface is disengaged from the rotary input member, wherein the wrap spring clutch is movable from the coil disengagement position to the coil engagement position via a coil engagement torque that is higher than the first torque but is lower than the second torque,
   wherein, when the armature is in the armature disengagement position, the wrap spring clutch is in the coil disengagement position,
   wherein, when the rotary output member is stationary, resistance to rotation of the rotary output member is such that movement of the armature to the armature engagement position drives not more than the first torque from the rotary input member to the armature, from the armature to the second helical end of the wrap spring clutch, from the second helical end of the wrap spring clutch to the first helical end of the wrap spring clutch and from the first helical end of the wrap spring clutch into the rotary output member to drive the rotary output member through the first range of motion, without moving the wrap spring clutch to the coil engagement position,
   and wherein, after completion of the first range of motion, resistance to rotation of the rotary output member increases such that torque from the armature into the second helical end of the wrap spring clutch increases sufficiently to pass through the coil engagement torque, at which point the coil engagement surface of the wrap spring clutch engages the rotary input member, whereupon torque is transferred in parallel from the armature into the second helical end of the wrap spring clutch and also from the rotary input member into the wrap spring clutch via the coil engagement surface so as to transmit the second torque through the wrap spring clutch into the rotary output member.

2. The clutch system as claimed in claim 1, further comprising an actuator that is energizable and deenergizable, wherein one of energizing and deenergizing of the actuator drives movement of the armature to the armature engagement position and the other of energizing and deenergizing of the actuator drives movement of the armature to the armature disengagement position.

3. The clutch system as claimed in claim 2, wherein the actuator includes an electromagnetic coil, that is energizable via electric current.

4. The clutch system as claimed in claim 2, wherein energization of the actuator drives the armature to the armature engagement position.

5. The clutch system as claimed in claim 1, wherein the coil engagement surface is a radially outer surface of the plurality of coils.

6. The clutch system as claimed in claim 1, wherein the rotary input member is a pulley that is driven by a vehicular accessory drive belt, wherein the rotary output member is a hub that is shaped to mount to an accessory shaft of an accessory that is to be driven by the accessory drive belt.

7. The clutch system as claimed in claim 1, wherein the first helical end of the wrap spring clutch is engaged with a carrier, which is itself engaged with a first helical end of an isolation spring, wherein the isolation spring has a second end that is engaged with the rotary output member, such that torque transfer is carried out from the wrap spring clutch to the carrier, from the carrier to the isolation spring, and from the isolation spring to the rotary output member, wherein the isolation spring is a helical torsion spring.

8. The clutch system as claimed in claim 1, wherein the rotary output member is operatively connected to an accessory input structure that includes a plurality of rotatable accessory elements, which have a selected amount of play therebetween, wherein movement of the rotary output member through the first range of motion drives the plurality of rotatable components sufficiently to eliminate of the selected amount of play between the rotatable accessory elements, prior to movement of the wrap spring clutch to the coil engagement position.

9. A clutch system, comprising:
   a rotary input member that defines an axis;
   a rotary output member that is rotatable relative to the rotary input member, about the axis, wherein the rotary output member is movable from a stationary position through a first range of motion;
   an armature that is movable axially between an armature engagement position and an armature disengagement position, wherein, in the armature engagement position, the armature is frictionally rotationally engaged with the rotary input member, and in the armature disengagement position the armature is frictionally rotationally disengaged from the rotary input member; and
   a wrap spring clutch having a first helical end, a second helical end, and a plurality of coils therebetween, wherein the first helical end is operatively engaged with the rotary output member, wherein the plurality of coils have a coil engagement surface that is one of a radially outer surface of the plurality of coils and a radially inner surface of the plurality of coils, wherein the second helical end is rotationally connected to the armature, wherein the wrap spring clutch is movable between a coil engagement position and a coil disengagement position, wherein, in the coil engagement position, the coil engagement surface is engaged with the rotary input member, and wherein in the coil disengagement position, the coil engagement surface is disengaged from the rotary input member, wherein, when the armature is in the armature disengagement position, the wrap spring clutch is in the coil disengagement position, wherein, when the armature is in the armature engagement position torque is transferred initially from the rotary input member into the second helical end of the wrap spring clutch, helically through the wrap spring clutch from the second helical end of the wrap spring clutch to the first helical end of the wrap spring clutch, and from the first helical end of the wrap spring clutch into the rotary output member to drive the rotary output member through the first range of motion without moving the wrap spring clutch to the coil engagement position, and wherein beyond the first range of motion while the armature is in the armature engagement position, the wrap spring clutch is moved to the coil engagement position, such that torque is transferred at least in part from the rotary input member into the wrap spring clutch through the coil engagement surface, at least in part from the coil engagement surface through the wrap spring clutch to the first helical end of the wrap spring clutch, and from the first helical end of the wrap spring clutch into the rotary output member to drive the rotary output member.

10. The clutch system as claimed in claim 9, further comprising an actuator that is energizable and deenergizable, wherein one of energizing and deenergizing of the actuator drives movement of the armature to the armature engagement position and the other of energizing and deenergizing of the actuator drives movement of the armature to the armature disengagement position.

11. The clutch system as claimed in claim 10, wherein the actuator includes an electromagnetic coil, that is energizable via electric current.

12. The clutch system as claimed in claim 10, wherein energization of the actuator drives the armature to the armature engagement position.

13. The clutch system as claimed in claim 9, wherein the coil engagement surface is a radially outer surface of the plurality of coils.

14. The clutch system as claimed in claim 9, wherein the rotary input member is a pulley that is driven by a vehicular accessory drive belt, wherein the rotary output member is a hub that is shaped to mount to an accessory shaft of an accessory that is to be driven by the accessory drive belt.

15. The clutch system as claimed in claim 9, wherein the first helical end of the wrap spring clutch is engaged with a carrier, which is itself engaged with a first end of an isolation spring, wherein the isolation spring has a second end that is engaged with the rotary output member, such that torque transfer is carried out from the wrap spring clutch to the carrier, from the carrier to the isolation spring, and from the isolation spring to the rotary output member, wherein the isolation spring is a helical torsion spring.

16. The clutch system as claimed in claim 9, wherein the rotary output member is operatively connected to an accessory input structure that includes a plurality of rotatable accessory elements, which have a selected amount of play therebetween, wherein movement of the rotary output member through the first range of motion drives the plurality of rotatable components sufficiently to eliminate of the selected amount of play between the rotatable accessory elements, so as to eliminate any impacts between the rotatable accessory elements as a result of movement of the armature to the armature engagement position.

17. A method of driving an accessory shaft of an accessory, comprising:
 a) providing a clutch system that includes a rotary input member, a rotary output member that is operatively connected to the accessory shaft, and a wrap spring clutch having a first helical end, a second helical end, and a plurality of coils therebetween, wherein the first helical end is operatively engaged with the rotary output member, wherein the plurality of coils have a coil engagement surface that is one of a radially outer surface of the plurality of coils and a radially inner surface of the plurality of coils, wherein the second helical end is rotationally connected to the armature;
 b) moving the armature to engage the rotary input member so as to drive the armature rotationally;
 c) transmitting a first torque from the rotary input member to the armature, from the armature to the second helical end of the wrap spring clutch, from the second helical end of the wrap spring clutch to the first helical end of the wrap spring clutch and from the first helical end of the wrap spring clutch into the rotary output member to drive the rotary output member through a first range of motion, without moving the wrap spring clutch to a coil engagement position, thereby initiating rotation of the rotary output member from a stationary position without engagement of the coil engagement surface of the wrap spring clutch with the rotary input member;
 d) after step c), transmitting a coil engagement torque that is higher than the first torque, thereby driving the coil engagement surface of the wrap spring clutch to engage the rotary input member; and
 e) after step d), transmitting a second torque that is higher than the coil engagement torque to drive the accessory shaft to carry out an operation of the accessory.

* * * * *